Fig. 5
| 15-12 | 15-11 | 15-10 | 15-9 | 15-8 (SOMI) | 15-7 (EOMI) | 15-6 (CA) | 15-5 (S1) | 15-4 (S2) | 15-3 (DA) | 15-2 | 15-1 | 15-0 |
0 1 2 3 4 5 6 7 8 9 10 11 12 13 14 15 16 17 18 19 20 21 22 23 24 25 26 27 28 29 30 31
Fig. 6
| 32-1 | 32-2 | 32-2' | 32-3 | 32-4 |
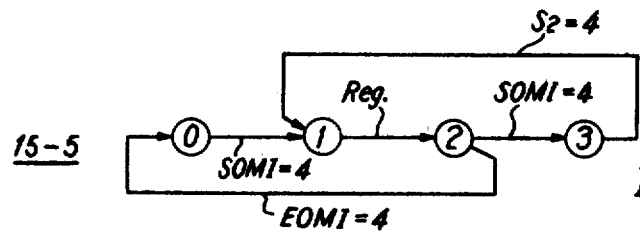
Fig. 7A
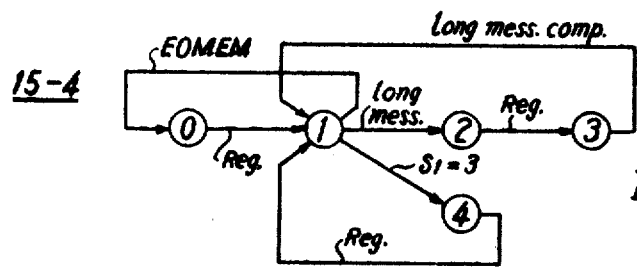
Fig. 7B

Fig. 10

| 20 | | | | | | |
|---|---|---|---|---|---|---|
| 20-1 L S T W A Q R | 20-2 | 20-3 | 20-4 | 20-5 | 20-6 (Qjp) | 20-8 |

Fig. 11

| 20-7 | | |
|---|---|---|
| 20-7-1 | 20-7-2 | 20-7-3 |

| 1 | 2 | 3 | 4 | 5 | 6 | 7 | 8 | 9 | 10 | 11 | 12 | 13 | $n-3$ | $n-2$ | $n-1$ | $n$ |

| 1 | 2 | 3 | 4 | 5 | 6 | 7 | 8 | 9 | 10 | 11 | 12 | 13 | $n-3$ | $n-2$ | $n-1$ | $n$ |

Fig. 14A
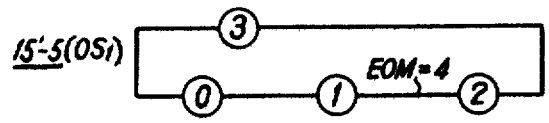
Fig. 14B
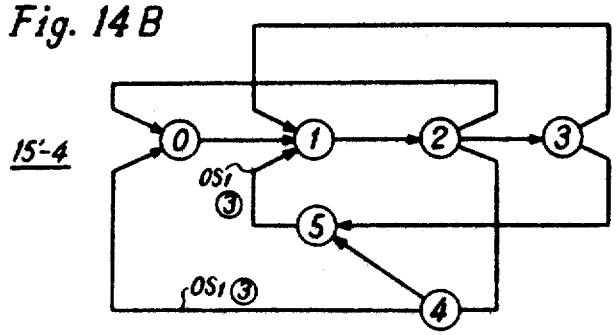
Fig. 15

United States Patent Office 3,516,074
Patented June 2, 1970

3,516,074
TIME-DIVISIONAL ACCUMULATION AND DISTRIBUTION SYSTEM FOR DIGITAL INFORMATION
Hajime Enomoto, Ichikawa-shi, and Yukio Nakagome, Seiichi Inoue, Yasuo Koseki, Yasuo Fukata, Naohiko Hattori, and Keiichi Yamamoto, Tokyo-to, Japan, assignors to Kokusai Denshin Denwa Kabushiki Kaisha, Tokyo-to, Japan, a joint-stock company of Japan
Continuation of application Ser. No. 589,388, Oct. 25, 1966. This application July 10, 1969, Ser. No. 843,911
Claims priority, application Japan, Nov. 1, 1965, 40/66,703; Mar. 19, 1966, 41/16,790, 41/16,791
Int. Cl. H04j 3/00
U.S. Cl. 340—172.5                                            6 Claims

ABSTRACT OF THE DISCLOSURE

A time-divisional accumulation and distribution system for digital information in which a plurality of input channels and a plurality of output channels are time-divisionally connected respectively; where serial digital signals of the input channels are stored, in memory zones of a serial-access mass memory, time-divisionally for each of the input channels in a word-wise manner and distributed, from the memory zones of the serial-access mass memory in a word-wise manner after conversion to serial digital signals, time-divisionally for each of the output channels. The digital signals stored in the serial-access mass memory are processed, in a message-wise manner for each of the memory zones of the serial-access mass memory, by at least one data-processor by use of a mass memory control comprising a group of registers of random-access type which store respectively the control information of the respective zones of the serial-access mass memory, the control information stored in the respective registers being read out successively in response to serial-access to the memory zones of the serial-access mass memory.

This invention relates to a time-divisional accumulation and distribution system for digital information and more particularly to a time-divisional accumulation and distribution system linked with a plurality of communication circuits for digital information and being capable of storing and exchanging their digital information.

This application is a continuation in part of our co-pending application, Ser. No. 589,388, filed on Oct. 25, 1966, and now anbandoned.

In such conventional time-divisional switching systems, (1) line signals received at a terminal equipment (a communication buffer for receiving information of data communication circuits) are successively and repeatedly scanned; (2) an aggregate signal obtained by the scanning operation is applied to and stored into a high speed random access memory of a digital computer (a processor for digital information) to form respective messages; (3) the respective messages are processed and accompanied with additional information generated in the processor; and (4) such processed messages are returned to the terminal equipment or transmitted to another terminal equipment to convert into line signals of respective output channels to be linked with respective input channels. In such conventional switching systems, since the computer stores into its high speed random access memory the digital information scanned by its scanning function and carries out the distribution operation of the stored and processed digital information by its distribution function, a time necessary for collecting and distributing the digital information of the respective linked channels is considerably long as it reaches up to fifty percent (50%) or, frequently, seventy percent (70%) of the actual operation time of the processor. Accordingly, the available computing time of the processor used in the conventional switching system becomes considerably low in comparison with its total operation time, and the number of processable data channels therefore decreases.

An object of this invention is to provide an accumulation and distribution system of digital information capable of processing, effectively in time, the digital information of a number of input channels in a message-wise manner.

Another object of this invention is to provide an accumulation and distribution system in which the time-divisional data collection-and-distribution function and the data accumulation-and-process function are performed in different timing conditions from each other.

Another object of this invention is to provide an accumulation and distribution system capable of processing repeatedly the digital information in a case of erroneous processing by the processor of the system.

Another object of this invention is to provide an accumulation and distribution system capable of accumulating therein a certain amount of the digital information of each of a plurality of input channels even if the amounts of the digital information exceeds the data process ability of the processor of the system.

Another object of this invention is to provide an accumulation and distribution system capable of accumulating therein a certain amount of digital information of respective one of a plurality of input channels even if the processed digital information cannot be transmitted to the corresponding output channels.

Another object of this invention is to provide an accumulation and distribution system capable of handling the digital information of data channels operating in different modulation rates (telegraph speeds).

Further object of this invention is to provide an accumulation and distribution system capable of detecting effectively "error" of the data process of the processor in the system.

The novel features of this invention are set forth in the appended claims, however this invention, as to its construction and operation together with other objects and advantages thereof, may best be understood by reference to the following description, taken in connection with the accompanying drawings, in which the same parts are designated by the same characters, numerals and symbols, and in which:

FIG. 5 shows an example of the control word register used in the system of this invention;

FIG. 6 shows an example of a message to be processed in the system of this invention;

FIGS. 7A, 7B, 14A and 14B show transition diagrams for explaining operation of the system of this invention;

FIGS. 8 and 15 show states of the control words used in the system of this invention;

FIGS. 10, 11, 12 and 13 show respectively examples of the control words used in the system of this invention;

FIG. 18 is a block diagram for explaining data process of the processor used in the system of this invention.

Figure 1:
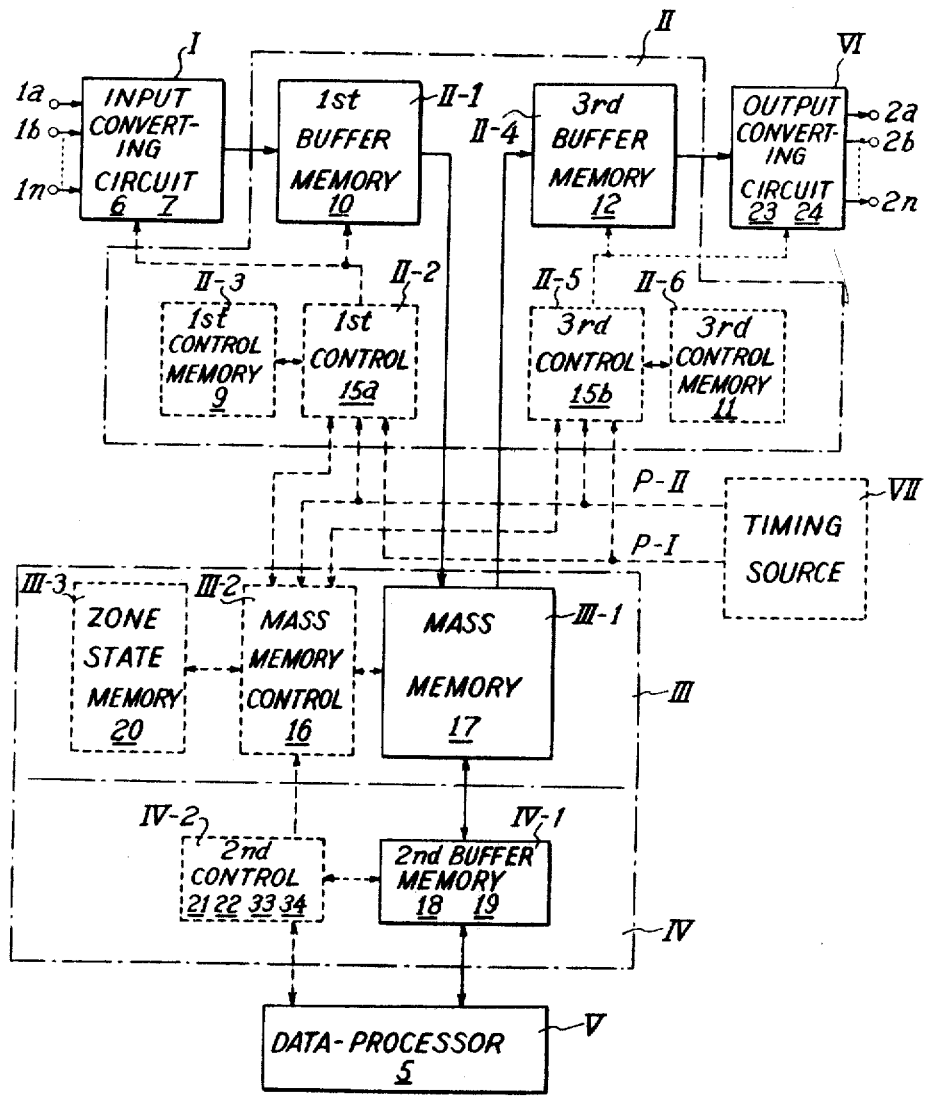
FIG. 1 is a block diagram for describing the principle of this invention.
Figure 2:
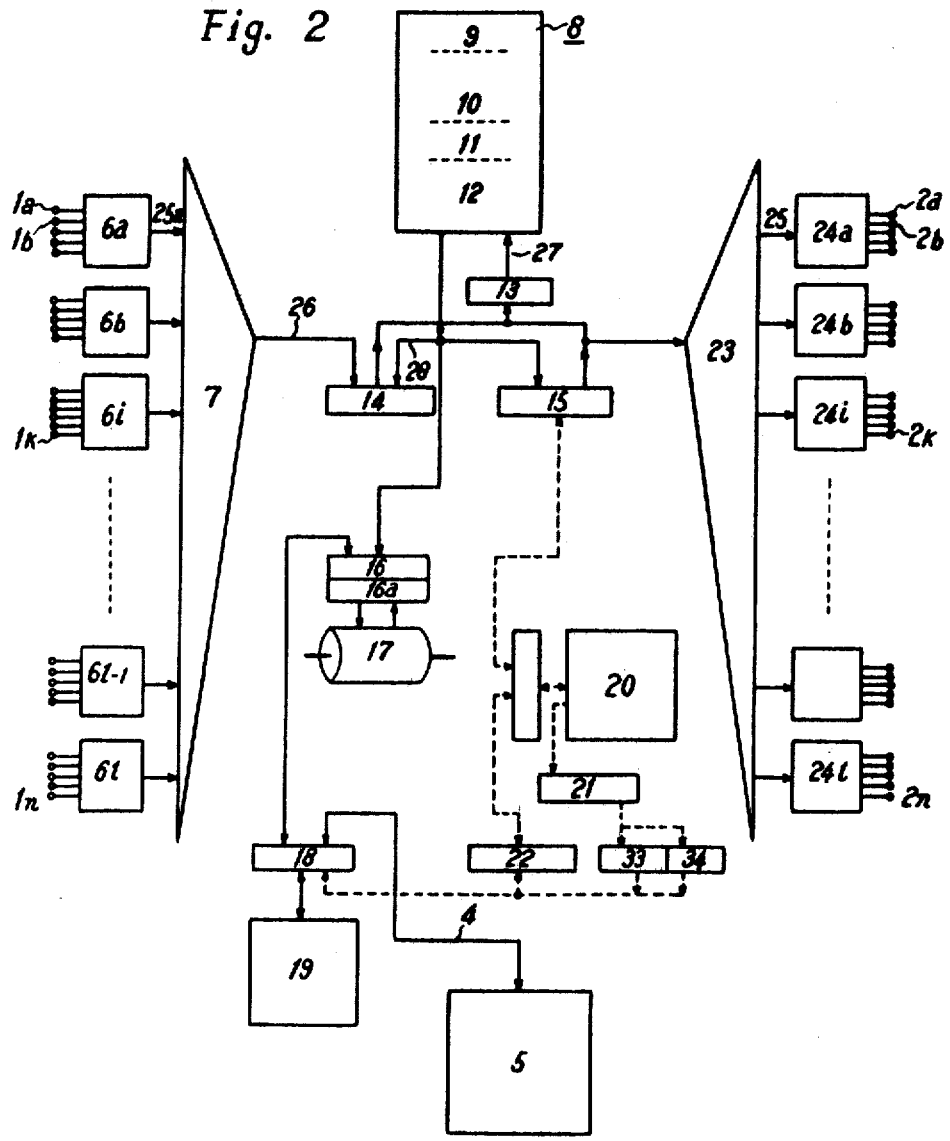
FIG. 2 is a block diagram for illustrating an embodiment of the system of this invention.

Referring to FIGS. 1 and 2, the construction and operation of the system of this invention will first be summarized. The system of this invention can be divided into six units I, II, III, IV, V and VI. Reference numerals, such as 6, 7 . . . 33 and 34, are sub-units of the respective units and correspond to the respective circuits shown in FIG. 2.

The unit I is an input converting circuit. A plurality of input channels 1a, 1b, 1c . . . 1n handling digital information (for example: 5-unit telegraph signals) are directly connected to the input terminals of the unit I, and the serial digital signals of the respective input channels are scanned and sampled in a time-divisional manner, by use of sampling pulses which are generated at unit I, to form parallel characters (parallel digital signals composing respective characters). This unit I comprises several sub-units of time-divisional serial-parallel converters, 6a, 6b . . . 6l.

To each one of the converters, input digital channels operating in the same modulation rate as to one another are connected. To different converters, input digital channels operating in different modulation rates from one another may be connected. The respective outputs of the converters 6a, 6b . . . 6l are the parallel characters and transferred to the unit II in the same transfer rate as to one another even if the input channels of the respective converters are operated in different modulation rates.

The unit VI is an output converting circuit. A plurality of output channels 2a, 2b, 2c . . . 2l handling digital information (for example: 5-unit telegraph signals) are directly connected to the output terminals of this unit VI. This unit VI comprises several sub-units of time-divisional parallel-serial converters 24a, 24b . . . 24c. To any one of the converters output channels operating in the same modulation rate are connected.

To different converters, output digital channels operating in different modulation rates from one another may be connected. The parallel characters distributed from the unit II to each sub-unit of this unit VI has the same transfer rate (telegraph speed) as to one another, and each of the sub-units converts the parallel characters into serial signals of respective output channels in a time divisional-manner for each of the output channels.

The unit II is divided into six sub-units. Sub-unit II–1 is a first buffer memory, sub-unit II–2 a first control, sub-unit II–3 a first control memory, sub-unit II–4 a third buffer memory, sub-unit II–5 a third control and sub-unit II–6 a third control memory.

The sub-unit II–1, the first buffer memory, has a plurality of input data word registers 10, each of which corresponds to the respective input channels 1a, 1b, 1c, . . . 1n.

The sub-unit II–4, the third buffer memory 12, has a plurality of output data word registers 12, each of which corresponds to the respective output channels 2a, 2b, 2c . . . 2n.

The sub-unit II–3, the first control memory 9, is composed of input control words, each of which corresponds to each input channel. Each input control word holds information indicating the state of accumulating the incoming data from the corresponding input channel to the first buffer memory.

The sub-unit II–6, the third control memory 11, is composed of output control words, each of which corresponds to each output channel. Each output control word holds information indicating the state of distributing the outgoing data to the corresponding output channel from the third buffer memory.

The sub-unit II–2, the first control 15a, controls to accumulate, into words, characters transferred from the input converting circuit 6 and to control to store the accumulated words to respective memory areas of the first buffer memory 10 in cooperation with the first control memory 9.

The sub-unit II–5, the first control 15a, detects the start and end of each message, and sets the state of the first control memory to a desired state, such as start or end of the distribution of message, in cooperation with the first control memory 9.

In cooperation with the third control memory 11, the third control 15b controls to convert to characters the words transferred from the serial-access mass memory so as to distribute the words to the respective output channels.

The unit III is divided into three sub-units.

The sub-unit (III–1) is a sequential access mass memory 17 such as a magnetic drum or a magnetic disc memory. The store-and-read out operations of the mass memory 17 are controlled by sub-units III–2 and III–3. The storage space of the mass memory 17 is divided into several thousands of memory zones into each of which several tens of words can be stored as a message or a part of message. The words of respective input channels transferred from the first buffer memory 10 are stored into the respective zones of the mass memory 17 in a message-wise manner for each channel. The message processed as described below and stored in the respective memory zones are transferred to the third buffer memory 12 of the sub-unit II–4. Each zone is accessible in the order of the revolution of the drum and the drum position indication of this mass memory 17 operates in synchronous with the drum revolution.

The sub-unit (III–3) is a zone control memory 20, and consists of control words corresponding to each zone. Each control word has information for controlling the operation of the corresponding zone and for transferring the information between the mass memory 17 and the first buffer memory 10, between the mass memory 17 and the third buffer memory 12 and between the mass memory 17 and a second buffer memory 17.

The sub-unit III–2 is a mass memory control 16. According to the drum position indication of the mass memory 17, the mass memory control 16 reads out a control word corresponding to the indicated zone from the zone control memory 20. According to the control state of the control word read out as mentioned above, the registration of an input channel starting to accumulate the message thereof is performed and the transferring the words from the first buffer memory 10 to the mass memory 17 is also performed cooperation with the operation of the first control 15a. In cooperation with the third control 15b, the mass memory control 16 transfers the information from the mass memory 17 to the third buffer memory 12, and further the block transfer of information is carried out between the mass memory 17 and the second buffer memory 19 in cooperation with a second control 21.

The unit IV is composed of a sub-unit IV–1 (i.e.; the second buffer memory of a random access memory 19) and a sub-unit IV–2 (i.e.; the second control of a register 18). They are employed for temporarily storing message to transfer to and from the respective memory zones of the serial-access mass memory 17 in a message-wise manner.

The unit IV–2 is a control means for controlling to mutually transfer messages, between the respective memory zones of the serial-access mass memory 17 and the second buffer memory means VI–1, under control of the processor V.

The unit V is a data processor 5, such as an electronic computer, which processes messages stored into the random-access memory 19 of the unit IV–1. The processor 5 employs the memory 19 as if the memory 19 belongs to itself.

The unit VII is a timing source which generates a timing signal P–I and a timing signal P–II. The timing signal P–I controls the time-divisional accumulation and distribution function of the unit II; and the timing signal P–II controls the store and read out operation of the mass memory unit III in cooperation with the first control II–2 and the second control II–5.

Figure 3:
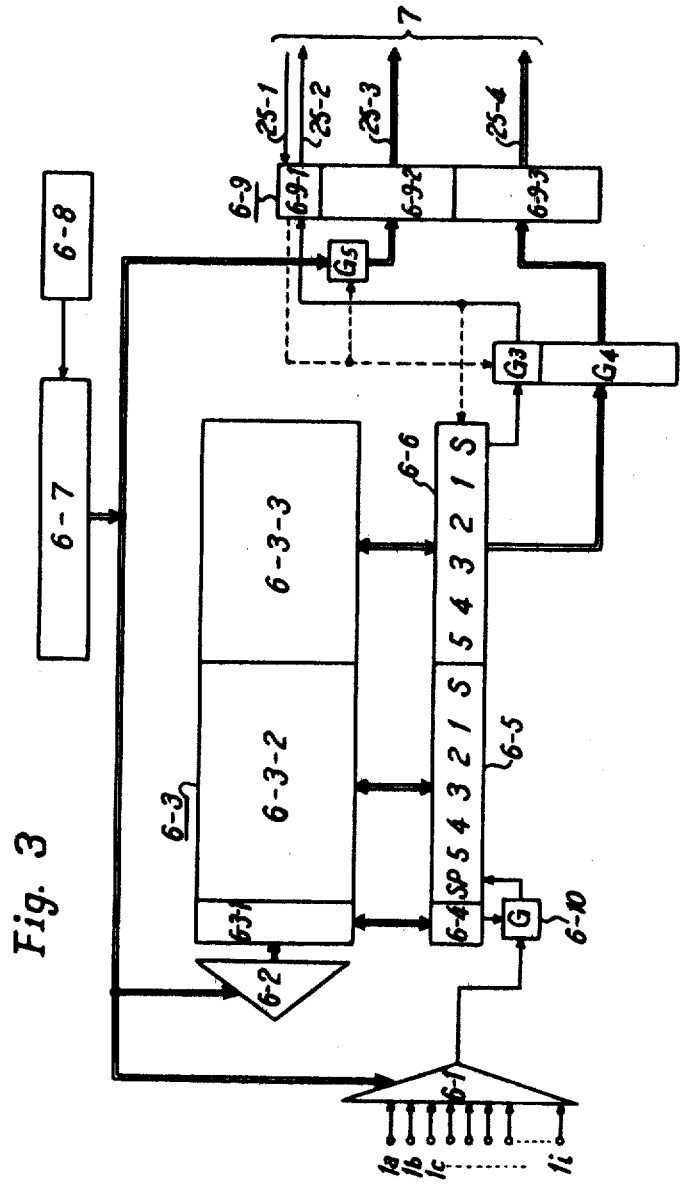
FIG. 3 is a block diagram for illustrating an example of the input serial-parallel converter used in the system of this invention.

Referring to FIG. 3, an example of one of the converters 6a, 6b . . . will now be described in its construction and operation in case of handling a plurality of 5-unit telegraph signals. The telegraph signals processed in any one of the converters 6a, 6b . . . 6 have the same modulation rate as to one another as described above. The telegraph signals supplied from the terminals 1a, 1b . . . 1i of input telegraph circuits are applied to an input channel scanner 6–1. On the other hand, a clock pulse train generated at a clock pulse generator 6–8 is applied to an address counter 6–7 which counts pulses of the clock pulse train. By the application of the counting state of the address counter 6–7 to the input channel scanner 6–1, the scanner 6–1 sweeps channel addresses of the input telegraph channels 1a, 1b . . . 1i. The respective telegraph signals of the channel addresses designated successively by the increasing counting states of the clock counter 6–7 are time-divisionally sampled at the scanner 6–1 and applied to a gate circuit 6–10 as an time-divisionally aggregated signal. The counting state of the counter 6–7 is simultaneously applied to an address decoder 6–2 which is employed for designating an address of a random access memory 6–3. The memory 6–3 comprises an element scale counter 6–3–1, a character serial memory 6–3–2 and a character parallel memory 6–3–3. The element scale counter 6–3–1 has a time divisional scale function for sampling the center of each of signal elements of the telegraph signals. An element scale counter 6–4 generates, in a time divisional manner for each of the input channels 1a, 1b . . . 1i, gate pulses each of which is timed with the center of each code element of the input signal of the corresponding input channel. By use of said gate pulses generated from the element scale counter 6–4, the gate circuit 6–10 samples, in a time divisional manner for each of the input channels, the time-divisionally aggregated signal and applies its detected output to a serial-register 6–5. The character serial memory 6–3–2 stores, into its respective address which is designated by the address decorder 6–2, serial bits of information read out from the serial register 6–5 which is a shift register to be employed for temporarily storing serial bits of a character applied from the gate circuit 6–10. The character parallel memory 6–3–3 stores, into its respective address which is designated by the address decorder 6–2, parallel bits of information read out from a parallel register 6—6 which is employed for temporarily storing parallel bits read out sequentially from the serial register 6–5.

At every generation of one pulse from the pulse generator 6–8, the counting state of the clock pulse counter 6–7 increases by "1," and the address decorder 6–2 controlled by the clock pulse counter 6–7 reads out stored bits of information from the memory 6–3 and stores temporarily said read-out bits into the registers 6–4, 6–5, and 6—6. Only when the state of the element scale counter 6–3–1 is indicative of the center of a unit code element of the designated telegraph signal, the gate circuit 6–10 detects the polarity of the unit code element and shifts said detected bit to the left end of the serial register 6–5 so that the stored bits of the register 6–5 are shifted, by one bit, towards its right side. When one-bit shift of the register 6–5 is performed, all bits of information stored in the registers 6–4, 6–5 and 6–6 are transferred into an address of the memory 6–3 corresponding to its processed telegraph signal. In other cases in which the state of the element scale counter 6–3–1 is not indicative of the center of a unit code element of designated telegraph signal, bits of information stored in the registers 6–4, 6–5 and 6–6 are transferred again into the corresponding address of the memory 6–3 without the above mentioned sample-and-shift operation.

If the "start" polarity of the telegraph signal is designated by "1" in the register 6–5, completion of registration of one character into the register 6–5 can be detected by "1" shifted at the right end (S) of the register 6–5. In the case of such completion of the registration of one character, six bits of information inclusive of the start signal (S) and alphabetic signals 1, 2, 3, 4 and 5 are transferred simultaneously into the parallel register 6—6 as parallel bits of information which are then transferred into the parallel memory 6–3–3. Since bits of information stored in the serial register 6–5 are all read out to the parallel register 6—6, the serial register 6–5 is remained in an empty condition (0000000) which is transferred into the serial memory 6–3–2 at the same time as the transfer time of the parallel bits of information.

As mentioned above, bits of information stored in the parallel register 6—6 changes time-divisionally so as to be successively representative of the respective input telegraph channels (1a, 1b . . .). With reference to each of the input telegraph channels (1a, 1b . . . 1i), bits of information temporarily stored in the parallel register 6—6 changes so as to be representative of successive ones of their characters.

The bits of information stored temporarily in the parallel register 6—6 are transferred through AND gate circuits $G_3$ and $G_4$ to a block register 6–9 which comprises a sign element bit register 6–9–1, an address register 6–9–2 and a message register 6–9–3. The sign bit register 6–9–1 receives and stores the start bit (S) temporarily stored in the parallel register 6–6; the message register 6–9–3 receives and stores the alphabetic bits temporarily stored in the parallel register 6—6; and the address register stores the counting state of the address counter 6–7 which is applied through an AND gate circuit $G_5$. The AND gate circuits $G_3$, $G_4$ and $G_5$ are controlled by the state of the sign bit register 6–9–1 as designated by dotted lines. In this example, the gate circuits $G_3$, $G_4$ and $G_5$ are simultaneously opened or closed in accordance with the state "0" or "1" of the sign bit register 6–9–1. In other words, since the sign bit register 6–9–1 assumes the state "0" only when the block register 6–9 is kept in an empty condition, the bits of information stored in the parallel register 6—6 and the counting state of the address counter 6–7 are transferred, through respectively the opened gate circuits ($G_3$ and $G_4$) and $G_5$, into said empty block register 6–9. The start bit (S) of the parallel register 6—6 is reset by the output of the gate circuit $G_3$ when said transfer operation from the register 6—6 to the register 6–9 is performed. Bits of information stored into the block register 6–9 are maintained as they are until the input selector 7 of the succeeding stage reads them out in its successive selection operation of the respective converters 6a, 6b . . . 6l. By the selection operation of the input selector 7, bits of information stored in the block register 6–9 are transferred to the selector 7 through lines 25–2, 25–3 and 25–4; and at the same time, a signal Sr indicative of completion of the read-out operation returns through a line 25–1 and resets the block register 6–9 to its empty condition where bits of information stored in the parallel register 6—6 can be transferred to the block register 6–9.

Figure 4:
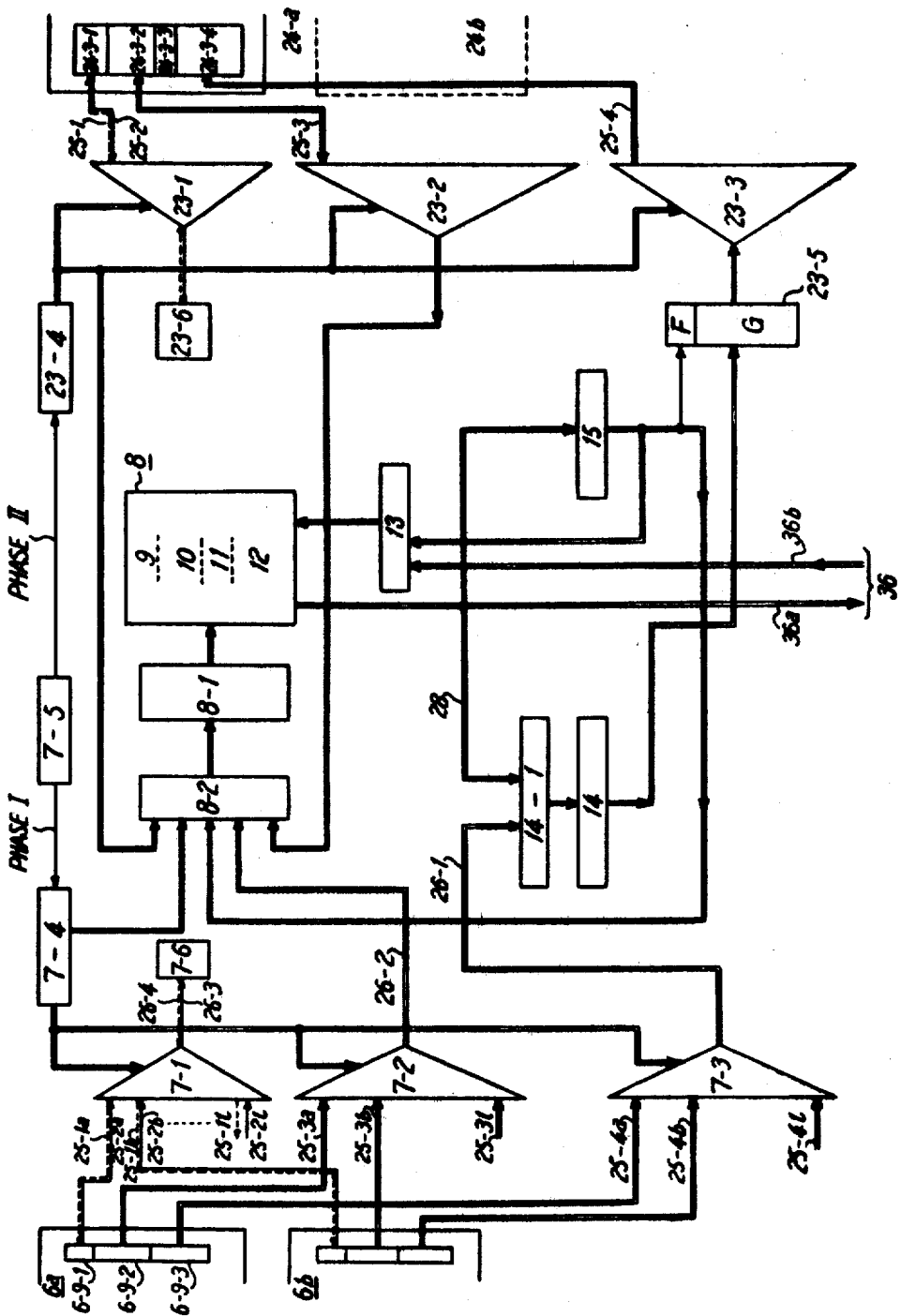
FIG. 4 is a block diagram for illustrating an example of the unit II shown in FIG. 1.

Referring to FIG. 4, an example of the input channel selector 7 will now be described in its construction and operation. This input channel selector 7 comprises, in view of its function, four means. Means (1) is composed of a sign bit selector 7–1 and a sign bit controller 7–6 to detect, in a time divisional manner for each telegraph signal, the states of the sign bit register 6–9–1 of the respective converters 6a, 6b . . . 6l and to determine to be able to transfer, in the similar time-divisional manner, the contents of the block register 6–9 to the selector 7 only when the detected state of the sign bit register 6–9–1 is "1." Means (2) is an address selector 7–2 which is employed for selecting, in the similar time-divisional the channel address stored in the address registers 6–9–2 of the respective converters 6a, 6b . . . 6l. Means (3) is a message selector for selecting, in the similar time-divisional manner, the messages stored in the message registers 6–9–3 of the respective converters 6a, 6b . . . 6l. Means (4) is a timing means to make said means (1), (2) and (3) to operate in the time-divisional manner and comprises a clock pulse generator 7–5 and a block address converter 7–4 which counts pulses of a clock pulse train of phase I from the clock pulse generator 7–5, which further generates a clock pulse train of phase II.

The sign bits 6–9–1, the address register 6–9–2 and the message register 6–9–3 are respectively connected to the sign bit selector 7–1, the address selector 7–2 and the message selector 7–3 through lines 25–2, 25–3 and 25–4 which are accompanied with suffixes a, b . . . l corresponding to the respective converter 6a, 6b . . . 6l. The signal Sr indicative of completion of the read-out operation from the sign bit register 6–9–1 and employed for resetting the sign bit 6–9–1 of the block register 6–9 is generated at the sign bit converter 7–6 and then applied to the block register 6–9 through a line 26–4, the sign bit selector 7–1 and the line 25–1. The selectors 7–1, 7–2 and 7–3 are simultaneously controlled by the counting state of the block address counter 7–4 so as to be timed with one another. The counting state of the block address counter 7–4 designates time-divisionally the converter 6a, 6b . . . 6l. Bits of information stored in the block registers 6–9 of the converters 6a, 6b . . . 6l designated by the block address counter 7–4 as mentioned just above are time-divisionally passed through the selectors 7–1, 7–2 and 7–3.

A buffer memory 8 comprises a plurality of input control words 9, a plurality of output control words 11, a plurality of input data words 10 and a plurality of output words 12. The respective input control words 9 and the respective input data words 10 correspond vis-à-vis to the respective input channels 1a, 1b . . . 1n. The respective output control words 11 and the respective output data words 12 correspond vis-à-vis to the respective output channels 2a, 2b . . . 2n. Each word of the input data words 10 and the output data words 12 is composed of a plurality of characters. The input control words 9 accept the address information passed through the address selector 7–2, an address modifier 8–2 and an address gate 8–1. The input data words 10 accept and accumulates as words therein the parallel characters passed through the message selector 7–3, a data word gate 14–1, a data word register 14 and a gate circuit 13. The output control words 11 store address information as described below. The output data words 12 accept therein processed data words as described below.

The input control words 9 and the output control words 11 are each temporarily transferred into a control word buffer register 15. FIG. 5 shows an example of the register 15. The formation of this register 15 is the same as those of the input control words 9 and the output control words 11. The control word register 15 stores the control information represented by reference 15–0 to 15–12 of FIG. 5. Each of numerals 0 to 32 is a bit of information employed for storing the respective information 15–0 to 15–12 as shown in FIG. 5. In this example, the control word register 15 comprises a flag bit 15–0, a parity bit 15–1, link bit 15–2, drum address bits 15–13, input-output control state (2) bits 15–4, input-output control state (1) bits 15–5, communication address bits 15–6, end of message bits 15–7, start of message bits 15–8, word scale bits 15–9, horizontal parity bits 15–10, a horizontal-parity indication bit 15–11, and a speed bit 15–12. The flag bit 15–0 indicates whether or not the message corresponding to its control word can be compared with messages of other synchronized processing systems when the message is going out of the system. The parity bit 15–1 indicates the parity bit of a set of control words stored in the register 15. The link bits 15–2 show zone addresses indicative of zones of a serial-access mass memory (FIG. 2) to each zone of which the corresponding message is to be stored. The drum address bits 15–3 show a starting address for transferring an input data word 10 into the serial-access mass memory. The input-output control state bits 15–4 indicate an input control state 2 ($IS_2$ of FIG. 7(B)) and an output control state 2 ($OS_2$ of FIG. 14(B)). The input-output control state (1) bits 15–5 indicate an input control state 1 ($IS_1$ of FIG. 7(A)) and an output control state 1 ($OS_1$ FIG. 14(A)). The communication address bits 15–6 indicate an address of the input data word to which information (for example, a 5-unit telegraph signal) designated by the address selector 7–2 and sampled by the message selector 7–3 is to be stored, or indicate an address of the output data from which information designated by the address selector 23–3 (it will be explained below) is sent out to the output channel. The end of message bits 15–7 are employed for indicating the end of message of the corresponding input (or output) channel. The start of message bits 15–8 are employed for indicating the start of message of the corresponding input (or output) channel. The word scale bits indicate a position within the input data words 10 to which position a character of five-to-eight-unit code is to be stored. The horizontal-parity bits 15–10 are employed for insuring the transmission and accumulation of information from a sending party against "error." The horizontal-parity indication bit indicates whether or not the corresponding input (or output) channel is a channel with "horizontal parity." The speed bit 15–12 shows a modulation rate of the corresponding input (or output) channel.

The input control states $IS_1$ (15–5) and $IS_2$ (15–4) change respectively in accordance with transition diagrams shown in FIG. 7A and FIG. 7B. The output control states $OS_1$ (15'–5) and $OS_2$ (15'–4) change respectively in accordance with transition diagrams shown in FIGS. 14A and 14B.

The message processed in this system has generally the format 32 (shown in FIG. 6) which includes a start of message 32–1, a channel serial number 32–2, a body of message 32–2', and an end of message 32–3. The message can be inclusive of a character with "horizontal parity" which is obtained as the result of parity check as to the respective code elements of the five to eight or six to eight unit telegraph signal just after the end of message. The format without the end of message 32–3 can be also handled. Such cases are, for example, interruptions of the respective transmitting channels or cancellations of the transmitting message.

An address of the input control words 9 is designated by the address modifier by the combination of the address bits coming from the input address selector 7–2 and the address bits of the block address counter 7–4, so that the input control word 9 is loaded onto the control word register 15 according to the modified address. Furthermore, the combination of the address bits coming from the input address selector 7–2, the address bits of the block address counter 7–4 and the communication address 15–6 of the control word register 15 designates the input data word 10 to be now modified through the address modifier 8–2.

The designated input data word 10 is read out to the data word register 14 which is employed for temporarily storing the data word 10. At the same time, a message passed through the message selector 7–3 is stored in a position of the register 15.

The similar designation is carried out as to process of the output data words 12.

Address from the output block address counter 23–4 and the address bits of an address selector 23–2 come into the address modifier 8–2 which generates the address to designate the corresponding output control word 11 and corresponding addresses of scanners 23–1, 23–2 and 23–3.

The output control word 11 designated is loaded to the control word register 15, and the communication address 15–6 of the register 15 designates the corresponding output data word 12. The designated data word 12 is read out to the data word register 14 the characters of which are to be distributed to the designated output channel.

When one cycle of storing information into the memory 8 is performed in synchronization with a pulse of the clock pulse generator 7–5, contents of the register 15 are modified and transferred again to the corresponding address of the input control words 9; at the same time, contents of the register 14 are transferred again, through a gate circuit 13, to the corresponding address of the input data word 10.

In the above-mentioned operation, if the state of the input sign control 7–6 is "1" in case of generating one pulse from the clock pulse generator 7–5, the data word register 14 stores a character and the state of word scale bits 15–9 increases by "1." That is, the character stored in the block register 6–9 is read out by a pulse generated from the clock pulse generator 7–5. In this case, when the value of the word scale 15–9 reaches to a value corresponding to the memory capacity of the data word register 14, the state of the communication address 15–6 increases by "1" and the state of the word scale 15–9 is reset to "0." At the same time, the modified state of the control word register 15 is transferred into the corresponding address of the input control words 9. On the contrary, if the state of the input sign control 7–6 is "0," such read-out operation of the control word register 15 is not carried out.

Operations of the circuit shown in FIG. 4 are carried out, in a time divisional manner under control of the pulse generator 7–5, as understood by the construction of this circuit.

Figure 9A:
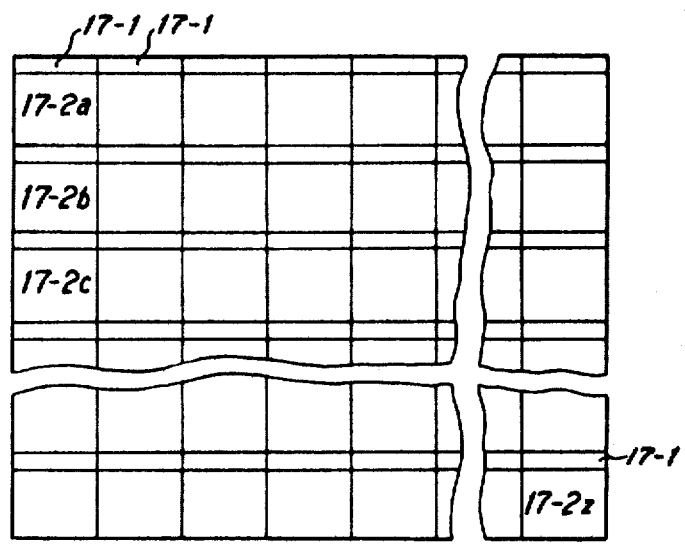
FIGS. 9A, 9B and 9C are schematic diagrams for explaining a memory zone or memory zones of the serial-access mass memory used in the system of this invention.
Figure 9B:
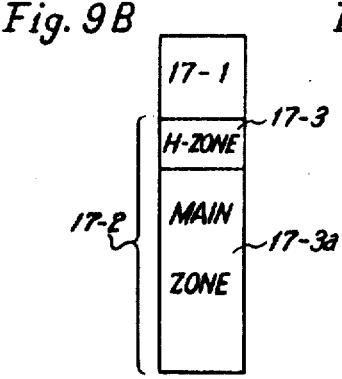
Figure 9C:
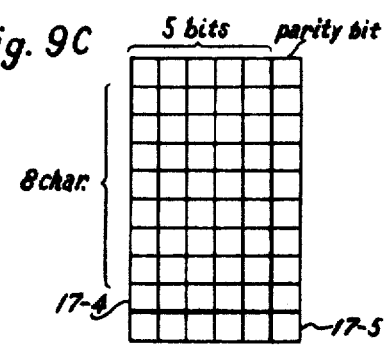

Referring to FIGS. 9A, 9B and 9C, an example of the sequential access mass memory 17 will now be described. The memory 17 is a mass memory, such as magnetic drum or magnetic disc and has several thousand memory zones in which a message can be stored. These zones are spirally and successively scanned. One cycle of spiral scanning of all the zones is called a grand cycle. In more particular description, the memory drum 17 has a number $z$ of inter-record gaps 17–1 and a number $z$ of divided zones 17–2, where "$z$" is the number of divided zones of the memory drum 17 and determined in accordance with the capacity of each zone and the memory capacity of the drum 17. Data processing for each of the memory zones 17–2 is carried out in the interval of the corresponding inter-record gap 17–1 immediately preceding the respective memory zone 17–2. The length of each of the inter-record gaps 17–1 is determined so that a sufficient time is awaitable for processing information of a memory zone 17–2. In FIG. 9A, the inter-record gaps are indicated by references 17–1a, 17–1b . . . and the memory zones are indicated by references 17–2a, 17–2b . . . . Each of the memory zones 17–2 is divided into two areas. One is the H-zone 17–3 where the additional message which is generated from the processor 5 is stored and the other is the main zone 17–3a to which the message of an input channel is stored. The message zone 17–2 is composed of several tens of data words and FIG. 9(C) shows an example of the composition of one of the data word 17–3a in the memory zone 17–2. This example shows a case where a word memory consists of eight characters. End mark 17–4 of the data word indicates whether or not the data word is the end of message, the end of additional message or the start of message. The start of message is employed in case where the end of message is omitted for the message to be processed. A table 17–5 of the word memory is the label of the input channel used to make sure that the message is being accumulated from the designated input channel.

The memory drum control register 20 has a number $z$ of control words 20 which corresponding vis-a-vis to the respective memory zones 17–2 of the memory drum 17. Each of the control words comprises, as shown in FIG. 10, control state bits 20–1, input channel indication bits 20–2, serial number bits 20–3, next memory bits 20–4, word position bits 20–5, output-channel priority bits 20–6, and a flag bit 20–8. Moreover, the control state bits 20–1 comprise bits R, Q, A, W, T, S and L. The memory control state bits 20–1 show control states as to the corresponding memory zone 17–2.

In case of zero states of all the bits 20–1, it is indicated that the corresponding memory zone 17–2 is not being used.

The state "1" of the control state bit 20–1R indicates that the message stored in the corresponding addresses of the input data words 10 can be transferred to the memory drum.

The control state bit 20–1Q assumes the state "1" in an interval lasting after the completion of the message transfer from the input data words 10 to a corresponding memory zone 17–2 of the memory drum 17 until a request of process as to the transferred message is indicated at an input queuing register 33 (FIGS. 2 and 6).

The control state bit 20–1A assumes the state "1" in an interval lasting after said indication of the request of process until completion of data process by the processor 5 as to the transferred message.

The control state bit 20–1W assumes the state "1" in an interval lasting after the completion of data process by the processor 5 until the processed message is transferred to the output data words 12.

The control state bit 20–1T assumes the state "1" in an interval in which the processed message is transferred to the output data words 12.

The control state bits 20–1S assumes the state "1" in an interruption interval in which the transmission of the corresponding message is interrupted as the result of detection of errors carried out by an input serial-parallel converter 24.

The control state bit 20–1L assumes the state "1" in case where the message stored in a plurality of memory zones lasts over the interval of one memory zone 17–2.

The input channel indication bits 20–2 indicate the input channel number of the corresponding message.

The serial number bits 20–3 indicate the serial number of the corresponding message which number designates the order of processing the message. These serial numbers are given to the respective input channel as consecutive numbers.

The next memory bits 20–4 indicate consecutive memory zones into which successive divided parts of a message are stored when a long message lasting a plurality of memory zones 17–2 is to be processed.

The word position bits 20–5 indicate word positions of the corresponding memory zone 17–2 to which the corresponding message is transferred, word by word, from the input data words 10 and from which the corresponding message is transferred, word by word, to the output data words 12.

The output-channel priority bits 20–6 indicate the priority number of the output channel linked to the corresponding message. In the order indicated by the priority numbers, the processor 5 designates the memory zone to be processed.

The flag bit 20–8 is employed for indication of a message processed which is able to be compared with the message of the other of dual systems if any in sending out to the output-channel when dual operations of the dual systems are proceeded at concerters 24a, 24b . . . .

Data processing operation after the data selector 7 will be now described in view of the construction of the system described above. In a time-divisional operation cycle of the system, a message composed of characters of one input channel passed through the message selector 7–3 is applied, through a line 26–1, to the data word register 14 and temporarily stored in it. At this time, the start of message 32–1 is checked and the result of this check operation is stored in the start of message indication bits 15–8. When the start of message 32–1 is detected, the horizontal parity bits 15–10 is reset and begins to be checked. Moreover, the input control state $1(IS_1)$ shown in FIG. 7A is shifted from the state "0" to the state "1." In this case, an address of a memory zone 17–2 of the memory drum 17 to which the message is to be stored is registered into the input channel indication bits 20–2 of the memory drum control register 20. As the result of this registration, the input control state $2(IS_2)$ is shifted from the state "0" to the state "1," and the input control state $1(IS_2)$ is shifted from the state "1" to the state "2."

As the start point of the inter-record gap 17–1 corresponding to the message, contents of the memory drum control register 20 corresponding to the memory zone 17–2 are read out and transferred to a memory-drum control-word register 21. When the control state bit 20–1R assumes the state "1," the number of the input channel linked with the memory drum at this time is stored in the input channel indication bits 20–2. Moreover, the maxium serial number bits 20–7–3 of the input-channel serial number bits 20–7 (shown in FIG. 11) which is provided in the memory drum control register 20 is transferred to the serial number bits 20–3. This serial number indicates the processing order of the processor 5. In this case, the state of the maximum serial number 20–7–3 increases by "1." At the initial condition, the word position bits 20–5 which are employed for indicating word positions of the corresponding memory zone 17–2 indicate a position succeeding to the additional memory zone 17–3 (FIG. 9).

Referring to FIG. 4, characters passed through the message selector 7–3 are successively transferred to the data word register 14 to temporarily store them in it and then transferred to the input data words 10 to be stored successively in them. In accordance with such transfer operation, the state of the communication address bits 15–6 increase in the control word register 15. The number of bits of this communication address 15–6 is determined according to the memory capacity needed to store the input data words 10 which are given in accordance with the modulation rate (telegraph speed) of the input channel. By way of example, if the telegraph speed of 50 Bauds is adopted as a standard, the input data words 10 against an input channel of 100 Bauds have four words as shown in FIG. 8, and the communication address bits 15–6 have two bit states.

When the communication address bits 15–6 have stored in them a plurality of characters (for example, eight characters), that is, one word, which is determined by the word scale bits 15–9, the communication address bits 15–6 change the state from the state "00" to the state "01." In case of completion of storing the succeeding one word, the state of the communication address bits 15–6 is changed further from the state "01" to the state "10."

Figure 8:
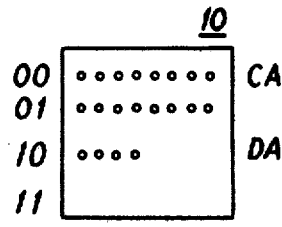

It is now assumed that when the state of the communication address bits 15–6 for an input channel is in the state "10" as shown in FIG. 8, the inter-record gap 17–1 corresponding to the memory zone 17–2 to which this input data word 10 is to be stored has reached to a head of the memory drum 17 and that the control state bit 20–1R is in the state "1" and other control bits 20–1S, 20–1Q, 20–1A, 20–1W, 20–1T and 20–1L are all state "0." Since this memory zone 17–2 is storing the message, the input data words 10 stored at the addresses (00) and (01) shown in FIG. 8 are to be transferred into the memory zone 17–2. Accordingly, the input control words 9 designated by the input channel indication bits 20–2 of the memory drum control register 20 are transferred into the control word register 15. In this case, if the states of the communication address bits 15–6 and the drum address bits 15–3 are not equal to each other, the control words 10 designated by the drum address bits 15–3 are transferred, through a line 36, to a drum memory register 16 (FIG. 2) and further to an auxiliary drum memory register 16a (FIG. 2). In other words, the input data word 10 stored into the address "00" shown in FIG. 8 are transferred into the auxiliary memory register 16a. In this case, the state of the drum address bits 15–3 increases by "1" so that the state "00" changes to the state "01."

Non-equality between states of the communication address bits 15–6 and the drum address bits 15–3 is thereafter checked and contents of the output data words stored in the address "01" are stored to the drum memory register 16. Moreover, equality between states of the address bits 15–6 and 15–3 is checked. At this time, the read out operation from the input data word 10 is interrupted. Within the interval of this operation or after this operation, when the head of the memory drum 17 reaches to the position designated by the word position bits 20–5 of the memory control drum register 20, contents of the auxiliary drum memory register 16a and the drum memory register 16 are successively stored into the memory zone 17–2 of the memory drum 17.

In case of a high speed exceeding 50 Bauds communication channel for which character transfer of several words or several tens of words is necessary between the data control words 10 and the memory drum 17, said word transfer is carried out, until the communication address bits 15–6 becomes to be equal to the drum address bits 15–3 by increasing the number of addresses, from the input data words 10 to the drum memory register 16. In this transfer operation, the state of the word position bits 20 increases successively by "1" and the transferred words are successively stored into the memory zone 17–2.

Since the memory capacity of the input data words 10 is designed so as to equal twice the memory capacity corresponding to the duration of one grand cycle of the memory drum 17 in accordance with the telegraph speed of the linked input channels, the state of the communication address bits 15–6 cannot reach to the state of the drum address bits 15–3.

A label 17–5 which had been added in the data word register 14 in case of transferring characters from the input data words 10 to the memory zone 17–2 is stored into the zone 17–2 together with the characters. This label 17–5 (shown in FIG. 9C) is employed for confirming continuity of divided parts of one message. By way of example, since the input channel indication bits 20–2 continues the state without change during the process interval for the message of one input channel, the input channel indication bits 20–2 can be adopted as the label 17–5.

The storing operation of the message of one input channel into the memory zone 17–2 is completed when the end of message 32–3 is detected. At this time, the end of message bits 15–7 of the control word register 15 becomes the state "4"; the input control state $1(IS_1)$ (FIG. 7A) is shifted from the state "2" to the state "0"; and an end mark 17–4 (FIG. 9C) is added, through the data word register 14, to the corresponding input data word 10. When this end mark 17–4 passed through the auxiliary drum memory register 16a, the input control state $2(IS_2)$ is shifted from the state "1" to the state "0" whereby the input control word 9 corresponding to the processed input channel is released to the initial condition. Moreover, the state of the control state 20–1Q changes to the state "1" and the state of the control state 20–1R changes to the state "0."

Over-flow of the long message from the memory zone 17–2 in said storing operation can be detected by over-flow of the word position bits 20–5. In this case, transfer operation of the input data words 10 to the memory zone 17-2 is timely interrupted even if the condition in which the states of the addresses 15-5 and 15-6 are equal to each other is not satisfied; and the control states 20-1L and 20-1Q change to the state "1." The over-flow message must be stored another empty memory zone 17-2. In this case of over flow, the input control state 2($IS_2$) is shifted from the state "1" to the state "2" and is searched. When an empty memory zone 17-2 is detected by serial access scanning of the memory drum 17, the memory drum control register 20 detects the input control word 9 with the state "2" of the input control state 2($IS_2$) and occupies this input control word 9. In this case, the control states 20-1L and 20-1R change to the state "1"; the corresponding channel number is registered into the input channel indication bits 20-2; the maximum serial number 20-7-3 of the input serial number 20-7 is registered in the serial number bits 20-3; and the state of the maximum serial number 20-7-3 increases by "1." Accordingly, the control state 2($IS_2$) is shifted from the state "2" to the state "3." In this case, the next memory bits 20-4 corresponding to the previously employed memory zone 17-2 for a long message is changed so as to indicate the new employed memory zone 17-2, and the control state bit 20-1L changes to the state "1," whereby the process for the long message is carried out. The input control state 2($IS_2$) is shifted from the state "3" to the state "1." At this time, the word position bits 20-5 over-flows; the address of the memory drum control register 20 is temporarily stored into the link bits 15-2 of the control word register 15; and the input control state 2($IS_2$) is shifted from the state "3" to the state "1." As a result of such operation, the process of the long message is performable. The loop shift of the states "1" — "2" — "3" — "1" as to the input control state 2($IS_2$) is repeatedly carried out until the end mark of the long message is detected. When the end of message 32-3 of the long message is detected, the system operates as to the message of normal length. That is, the input control state 1($IS_1$) changes from the state "2" to the state "0"; the input control state 2($IS_2$) changes from the state "1" to the state "0"; and the control state 20-1Q corresponding to the last memory zone assumes the state "1."

When the end of message 32-3 is detected, the horizontal parity bits 15-10 of the control word register 15 must be identical with the horizontal parity character 32-4 succeedingly applied. In an input channel for which the horizontal-parity indication bit assumes the state "1" (that is, an input channel with "horizontal parity"), test of coincidence between the horizontal parity bits 15-10 and the horizontal parity (FIG. 6) of the message is carried out. The horizontal parity sum of the parity bits 15-10 and 32-4 must be zero as to all the normal cases where the transmitted message has completely received: but if there is/are an error/errors, "1" is remained. This detection of "1" indicates that there is/are an error/errors at the input channel (1a, 1b . . . 1l) of the converter 6, and/or the input data words 10. The message detected as "error" is transferred to an error check means, as alarm, together with the corresponding input channel number.

If the end of message 32-2 is omitted from the message formation 32, the start of message 32-1 of the just succeeding message is regarded as an equivalent information of the end of message 32-3. Of course, the detection process of the start of message 32-1 must be carried out as to the succeeding message. If the input control state 1($IS_1$), the input control state 2($IS_2$) and the start of message bits 15-8 assume, respectively, the state "1," the state "1" and the state "4," the input control state 1($IS_1$) is shifted from the state "2" to the state "3" and the input control state 2($IS_2$) is shifted from the state "1" to the state "4." Furthermore, the control state bit 20-1Q changes to the state "1"; the input data word 9 concerned is abandoned; the input control state 1($IS_1$) is shifted from the state "3" to the state "1." If the head of the message drum reaches to an empty memory zone 17-2 by the spiral scanning operation, this empty memory zone 17-2 is adopted as a memory zone of the succeeding message, so that the control state bit 20-1R corresponding to this memory zone 17-2 changes to the state "1" and the bits 20-2 and 20-3 of the memory control register 20 are registered to the memory drum control register 20 corresponding to the memory zone. These registrations to the memory zones are substantially similar as the case where the start of message 32-1 is detected. After completion of the registration operation, the input control state 2($IS_2$) is shifted from the state "4" to the state "1" and the storing operation as to the succeeding message is started. With respect to the message without the end of message 32-3, the horizontal parity check is abandoned since the coincidence against the horizontal parity is not obtainable.

As to message applied successively to the memory zone 17-2 of the memory drum 17, the control state 20-1Q is established to the state "1." FIG. 12 shows formation of an input queuing register 33 which has n bits of flag positions corresponding vis-à-vis to the respective input channels 1a, 1b . . . 1n. This register 33 is employed for indicating completion of transferring the message of the respective input channel into the memory zone 17-2. Accordingly, when the message of the input channel 1a which is established to the state "1" of the control state 20-1Q has been transferred into one or more memory zone 17-2 of the memory drum 17, a bit 33-1 of the input queuing register 33 changes to the state "1." By this change of the state of the bit 33, the control state 20-1A changes to the state "1" and the control state 20-1Q changes to the state "0."

The processor 5 processes, in accordance with the order of input channel numbers, the messages stored in the memory zones 17-2 of the memory drum 17. If the corresponding bit 33-1 of the queuing register 33 has established the state "1" when the processor 5 has checked an input channel, the processor 5 designates the corresponding input channel and instructs to transfer its message from the memory drum 17 to the random access memory 19. This instruction of the processor 5 is ordered to a store-and-exchange control register 22, through a line 4, by use of the channel number bits 20-7-1 of the input serial number bits 20-7 (FIG. 11) as the index word. By this instruction, the message corresponding to the state of the minimum serial number bits 20-7-2 (that is, the message corresponding to the serial number to be first processed) is designated; a message stored in the memory zone 17-2 indicated by the input channel indication bits 20-2 and the serial number bits 20-3 each corresponding to the designated message is searched out; the searched out message is transferred as a block of information, through the memory drum register 16 and a core memory register 18, to a memory space of the random access memory 19 designated by the processor 5. In this case, the state of the minimum serial number bits 20-7-2 increases by "1" and the message control state bits 20-1A and 20-1Q of the succeeding message are, respectively, changes to the state "1" and "0" of their initial condition.

The block of information transferred into the random access memory 19 is time-divisionally processed by the processor 5 together with other messages temporarily stored in the memory 19. Processor 5 uses the random access memory 19 by its instructions as if the memory 19 is its internal memory means. If a data processing system is formed by parallel back-up systems the confirmation of coincidence relating to the channel serial number 32-2 (FIG. 6) of the input channel is first carried out so that the parallel systems process the same message as one another.

The messages processed by the processor 5 are classified according to the output channels and their priority orders known through the message process. Output-channel priority numbers are given, by the processor, to the memory drum control register 20. The respective output-channel priority numbers are transferred into the output-channel priority bits 20–6 of the corespondoing channel, so that the output-channel priority bits 20–6 are ready for the read-out process to each output channel of the respective message.

There is provided with an output queuing register 34 which has bits respectively corresponding to the output channels 2a, 2b . . . 2n. Each of the bits changes to the state "1" in case where the corresponding channel has no message in the memory drum 17 and/or the message of the corresponding channel has been sending out from the memory drum through the output data word buffer memory 12 (FIG. 2).

The processor 5 detects the states "1" of bits of the output queuing register 34 by the successive processes for the respective output channels and designates successively, according to the order of priority indicated by the output-channel priority bits 20–6 messages to be sent out.

The output-channel priority number D$jp$ indicated by the output-channel priority bits 20–6 is a serial number D which corresponds to a channel number ($j$) having the order of priority ($p$). The serial number D$jp$ of the processor has the maximum serial number D$jp$ max. and the minimum serial number D$jp$ min. The number D$jp$ min. is given to the message to the just succeedingly sent out, and the number D$jp$ max. is the serial number given to the message processed just precedingly. A condition where:

$$Djp \text{ max.} - Djp \text{ min.} \geq 0$$

indicates that a message has been processed and stored in the memory drum in the readable condition to be sent to the output channel.

A condition where:

$$Djp \text{ max.} - Djp \text{ min.} < 0$$

indicates that there is no message to be sent out in the memory drum 17. In case of being designated the serial number D$jp$, an additional message, if any, and the channel sequence number 32–2 are given to the message corresponding to the designated serial number D$jp$, and temporarily stored in the memory space of the additional message in the random access memory 19 and then transferred into the memory zone 17–3 of the additional message (in the memory drum 17) designated by the memory drum control register 20 by use of the serial number D$jp$ as an index. In this case, a head end mark 17–4 is added at the end of words of the additional message. When the additional message has been transferred from the random access memory 19 to the additional zone 17–3, the message control states 20–1W and 20–1A changes, respectively, to the states "1" and "0."

FIGS. 14A and 14B show transition diagram of the output control words 11 for the output channels are just like as the input control words 9 from the point of view of the contruction. The output control state I(OS$_1$) 15'–5 and the output control state 2(OS$_2$) 15'–4 are initially established to the state "0." When the out state 2(OS$_2$) 15'–4 assumes the state "0" or "1," the output parallel-serial converter 24 remains in the idle condition since characters cannot be sent out from the output control words 12 even if the converter 24 has a request for sending out messages. In case where the output control state 2(SO$_2$) 15'–4 is the state "0," the corresponding flag bit of the output queuing register 34 changes to the state "1" and request to the processor 5 to search out the sent out message and then the output control state 2(OS$_2$) 15'–4 is shifted from the state "0" to the state "1."

In case where (1) the serial number D$jp$ is given by the searching out of the corresponding message as mentioned above, (2) the additional message is added to the additional zone 17–3, and (3) the control state bit 20–1W changes to the state "1," when the reading head of the memory drum 17 reaches the memory zone 17–2 of the corresponding message by the revolution of memory drum, the control state bits 20–1T and 20–1W change, respectively, to the states "1" and "0." Furthermore, the output control state 2 (OS$_2$) 15'–4 is shifted from the state "1" to the state "2" and the request for searching for the next message to be sent out is instructed to the output queuing register 34 and then the output control state 2 (OS$_2$) 15'–4 is shifted from the state "2" to the state "3." When the next message is provided in the interval of said process, the control state bits 20–1W and 20–1A against the corresponding memory zone 17–2 change, respectively, to the state "1" and the state "0." A message indicated by the state "1" of the control state bit 20–1T is transferred word-wise into the output data words.

When the head of the memory drum 17 reaches to the memory zone 17–2 indicated by the state "1" of the control state bit 20–1T, the output control word 11 corresponding to the output channel designated by the serial number D$jp$ is read out to the control word register 15. In this case, if the states of the communication address bits 15–6 and the drum address bits 15–3 do not coincide with each other, the message is transferred in wordwise manner from a designated zone 17–2 of memory drum 17 to the output data word 12 designated by the drum address bits 15–3. This transfer operation is carried out from the top of the additional memory zone 17–3 of the corresponding memory zone 17–2. Into this top of the additional memory zone 17–3, the start of message 32–1 and the output-channel sequence number 32–2 are stored. At completion time of the transfer of one word, the state (DA) of the drum address bits 15–3 increases by "1." If the state (CA) of the communication address bits 15–6 coincides with the state (DA) of the drum address bits 15–3, one more data word is further transferred to the output data word 12 designated by the drum address bits 15–3. In the case shown in FIG. 8 by way of example, the transfer from the memory drum to the output data word 12 is carried out in the addresses (01), (10), (11). When the condition: CA=DA is obtained by said operation shown by terms (DA+1), the transfer is stopped. By way of example, the circulation of addresses is repeated through addresses (00), (01), (10), (11) and (00) as to a 100 Bauds telegraph channel and through addresses (00), (10) and (00) as to a 50–Bauds telegraph channel.

Since a condition: CA=DA−1 is generally satisfied in a case where the preceding message has been transferred to the output channel, the communication address bits 15–6 can send out a new transferred message from the memory drum if the transfer is started from a position designated by the communication address 15–6.

At the time when the transfer of a message from the memory drum 17 to the output data word 12 (FIG. 2), the check of the label added at the transfer of the message from the input data word 12 to the memory drum 17 is first carried out by adopting the input channel indication bits 20–2 as a reference. By this check, it is confirmed that divided parts of the messages have "continuity" as a message. At the same time, detection operation of an end mark 17–4 which comprises any one of the end marks of the additional message, the end mark of the start of message and/or the end mark of the end of message 17–4 is carried out. When the end mark of the additional message is detected, the state of the word position bits 20–5 skips without delay to a state indicative of the main zone (17–3a) which is the succeeding position to the additional memory zone 17–3 (of the memory zone 17–2). Accordingly, the body of the message can be sent out just succeedingly to the additional message.

Figure 16:
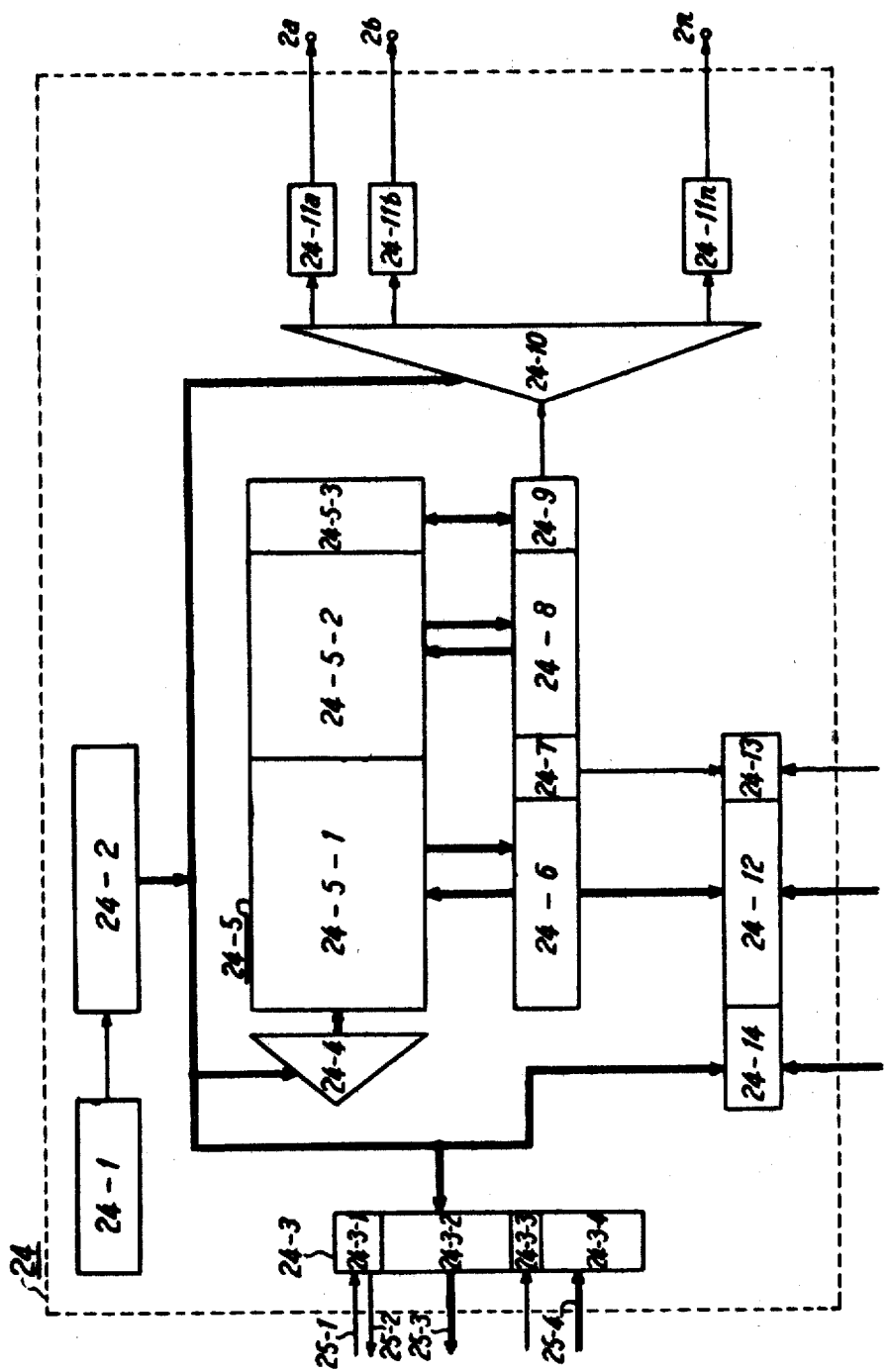
FIG. 16 is a block diagram of an example of the output parallel-serial converter used in the system of this invention.

Referring to FIGS. 4 and 16, the sending operation will be now described. The phase II of the clock pulse train generated from the clock pulse generator 7–5 is applied to the output block address counter 23–4 which scans successively and repeatedly the output block scanner 23. This scanner 23 comprises a sign bit scanner 23–1, an address scanner 23–2 and a message scanner 23–3. Into the address scanner 23–2, the state of an output address counter 24–2 (FIG. 16) is applied. When the sign bit selector 23–1 checks the state of the sign bit 24–3–1– of a block register 24–3, if the state of the sign bit 24–3–1 is the state "1," it is started to search out a character to be sent out to the output channel. In this case, the address selector 23–2 passes therethrough the state of an output data address register 24–3–2 and transfers to the address modifier 8–2 together with the state of the output block address counter 23–4. The output of the address modifier 8–2 is applied through the address gate 8–1 to the buffer memory 8, from which the output control word 11 corresponding to the linked output channel is read out to the control word register 15. Since there is no character to be sent in the case where the output control state 1 ($OS_2$) 15'–4 of the control word register assumes the state "0" or "1," no process is carried out for the output channel and then the similar check operation to the succeeding block register 24b is carried out. If the sign bit 24–3–1 is in the state "0" in this check operation, this check operation is shifted to the next serial-parallel converter at once without said read out of contents of the output control word 11.

When the message to be sent out is stored in the output data word 12, the output control state 2 ($OS_2$) 15'–4 assumes the state "2." The output data word 12 designated by the communication address 15–6 is read out to the data word register 14 and a character of the data word 12 passes through the gate G (23–5) according to the state of word scale bit 15–9. The data word 12 passed through the gate G is applied and stored to a message register 24–3–4 selected by the message selector 23–3. At this time, the output of the output sign bit control 23–6 resets the sign bit 24–3–1 through the sign bit selector 23–1.

The output parallel-serial converter detects the reset state of the sign bit 24–3–1 before the pulse generation of the just succeeding clock pulse from the output clock pulse generator 24–1, and the state of the message register 24–3–4 is transferred to a parallel character memory 24–6. At this time, if this transferred state (character) is formed by the same formation so as to carry out "coincidence" operation, the character is transferred to the output message scanner 23–5 together with the flag bit "1" which is added in case of transferring it from the data word register 14 to the gate G. This flag bit "1" changes the state of the sign bit to the state "1" at the message to be compared and the flag bit "1" is added to every character, in case of sending them out, until the end of message 32–3 comes in.

The address information of an output address counter 24–2 is applied simultaneously to an address decoder 24–4 and an address compare circuit 24–14.

The state of a parallel register with a sign bit 24–7 of the state "1" is transferred to a compare circuit 24–12 and a sign bit compare circuit 24–13 as shown to each of which the states of the parallel register 24–6 and the flag bit 24–7 of another system arranged in parallel are applied so as to carry out "coincidence" operation. In case where the sign bits 24–7 of the two system are the state "1," "coincidence" operation of the compare circuit 24–12 is carried out. If coincidence relationship between two input states of the compare circuit 24–12 is confirmed, the sign bits 24–7 of the two systems are reset to the states "0." After this, the state of the parallel register 24–6 is transferred to an address of a character parallel memory 24–5–1 designated by the address decoder 24–4.

If two input states of the compare circuit 24–12 do not coincide with each other, the state of the parallel register is transferred, as it is, to an address of the parallel character memory 24–4 and stored for waiting the next coincidence opportunity. In another case where the sign bits 24–7 of the two systems are both the state "1" and two input states of the compare circuit 24–12 do not coincide to each other, "alarm" is generated together with indication of the state of the address compare circuit coincidence 24–14 whereby the send out the checked character is deferred. A random access memory 24–5 controlled by the address decoder 24–4 compresses the character parallel memory 24–5–1, a character serial memory 24–5–2 and a channel state memory 24–5–3.

In case where the sign bit 24–7 assumes the state "0" the state of the parallel register 24–6 is transferred characterwise to a serial register 24–8 at the time when the serial register 24–8 has been sent out a character precedingly stored in it. The send out operation of this transferred character is carried out in such a manner that (1) control information stored in the channel-state memory 24–5–3 is transferred to a channel-state register 24–9, (2) content (i.e.; a character to be sent out) of the register 24–8 is passed through an output channel scanner 24–10 and applied to one of bistable circuits 24–11, and (3) the bistable circuit (channel flip-flop) selected regenerates the character and sends it to the output channel (2a, 2b . . . or 2n).

Since characters which are not indicated to be compared with the character of the other of the dual systems has the state "0" of the flag bit 24–7, they are automatically transferred from the parallel register 24–6 to the serial register 24–8 and sent out as mentioned above. The typical flow of data in the output parallel converter 24 is as follows; (1) For the single system: (24–3–4)—(24–6) — (24–5–1) — (24–6)—(24–8)—(24–11n) (2) For the dual systems: (24–3–4)—(24–6)—(24–5–1)—(24–6) and (24–12)—(24–8)—(24–5–2)—(24–8)—24–11m.

At the time when the control word register 15 indicates the coming-in of the end of message 32–1 in said sending out characters of the output data word 12, the output control state 1($OS_1$) 15'–4 changes from the state "0" to the state "1." When the state of the word scale 15–9 is then over-flowed, the state (CA) of the commuincation address 15–6 increases by "1" so that the succeeding output data word 12 is sent out. After this the successive data words 12 are sent out in such a manner that the state (CA) the communication address 15–6 follows to the state (DA) of the drum address (DA) 15–3. In this operation, succeeding new characters are filled in the output data word 12 until the state (CA) reaches the state (DA).

In said transferring operation from the drum memory 17 to the output data word 12, the end of mark 17–4 is detected by the output control word 11. The output control state 2($OS_2$) 15'–4 is shifted from the states "3" and "2" to the states "5" and "4" and the control states 20–1S and 20–1T of the corresponding message change, respectively, to the states "1" and "0." At this time, the word-wise transfer from the memory drum 17 to the output data word 12 is interrupted. Accordingly, the state (CA) of the communication address 15–6 approaches to the state (DA) of the drum address 15–3. When a condition: CA=DA–1 is satisfied, (1) the end of mark 17–4 is detected, (2) the end of mark indication bit 15–7 changes to the state "4," and (3) the output control state 1(OS1) 15'–5 changes from the state "1" to the state "2."

At the time of completion of this sending out operation, the output control state 1(OS1) 15'–5 changes from the state "2" to the state "3," so that the output control state 2(OS2) changes from the states "5" and "4" to the states "1" and "0." The shift from the state "4" to the state "5" is carried out at a time when the request for searching out the message to be sent out is transmitted to the output serial number register 34 in case of the state "4" of the output control state 2(OS2). If the state of the word scale 20–5 over-flows with respect to a message having the state "1" of the control state 20–1L in case of transferring from the memory drum 17 to the output data word 12, it is necessary to make divided parts of a long message to be continued. Accordingly, the control state 20–1T of the long message stored in the memory zone 17–2 to be continued changes without delay to the state "1" and the long message is consecutively transferred from the memory drum 17 to the output data word 12. In this case, the output control states 2(SO2) are shifted respectively from the state "2" and "3" to the states "0" and "1." When the long message has been sent out through the output data word 12, its control states 20–1L, 20–1S and 20–1T change, respectively, to the states "1," "1" and "0."

When the end mark 17–4 of the start of message is detected in case of transferring the message from the memory drum 17 to the output data word 12, the formation of this message does not coincide with the formation 32. Since this message is transferred to check means connected to this system, the process is shifted to the sending out of the succeeding message similarly as the long message and the process for the end mark is not carried out for this error message.

When the end of message bits 15–7 change to the state "4" and the output control state 1(OS1) 15–5 changes to the state "2" with respect to a message having the state "1" of the control state 20–1S and the state "0" of the control state 20–1T, the state of the memory drum control register 20 corresponding to the memory zone of this message is reset to the state "00 . . . 0" of empty condition.

If a message having the state "1" of the control state 29–1S and the state "0" of the control state 20–1T does not coincide at the compare circuit 24–12, checking operation by the check means mentioned above is carried out against the system regarded as "fault." In case where it is confirmed that the checked system is the normal condition without "fault," the message is again sent out from the start thereof by setting the control states 20–1S and 20–1T to the states "0" and "1" respectively.

If a message having the state "1" of the control state 20–1T does not coincide at the compare circuit 24–12 with the same message processed at the other of the dual systems, the control states 20–1S and 20–1T are established both to the state "1." After the check operation for "fault" is carried out similarly as described above, the message is again sent out from the start thereof by setting the control states 20–1S and 20–1T to the states "0" and "1" respectively. In the case where a message having the state "1" of the control 20–1W does not coincide with a now transferred message, the control states 20–1S and 20–1W of this message are established both to the states "1" and this message is not linked with the output data word 12. When the coincidence as to this message is obtained at the compare circuit 24–12, the control states 20–1S and 20–1W reset to the normal states "0" and "1" respectively.

The monitoring system of this invention employed for improving the reliability of the process of the processor 5 will now be described. To make difference between conventional monitoring systems and the monitoring system of this invention clear, the outline of the conventional system will be first described.

To obtain the high reliability of data processing a usual, conventional system is composed of dual systems operating in parallel. Confirmation of correct operation of the data process is carried out by detecting coincidence between two output results of the parallel processors. However, it cannot actually synchronize two processors operating independently to each other. Accordingly, one of processors in which the data process has been performed earlier than the process of the other of the processors awaits the completion of data process of the other processor. In this method, there will be accordingly a waste of time if compare operations of processed results are frequently to be carried out.

To avoid this waste of time, the confirmation of the coincidence may be carried out after processing of a block of data without frequent checking operations. In this method, there are the following disadvantages. (1) In case of processing a great amount of data, such as an electrical computing data processor, it is not so easy to confirm the coincidence between output results since the result itself becomes a considerable amount of data. (2) Even if any error is detected as to their output results, it cannot be known that from what step of the data-processing the error is produced so that any data for searching "fault" parts of the processor are not obtainable. Accordingly the data processing inclusive of such error must be again carried out at the start thereof. (3) If one of the processors is in the "fault" so that the processing of its program runs away, the other of the processors operating in the normal condition is also apt to run away frequently.

One system (A) of the monitoring system of this invention without said disadvantages has the following features. (1) The monitoring system of this invention can be applied to both a serial multiplex data processor and a parallel multiplex data processor. (2) Test of the output result is carried out for only compressed short data obtained from the processed result in accordance with the predetermined principle. (3) The compressed short data is collected from respective results of divided jobs of a data-processing.

Figures 17, 18A, 18B:
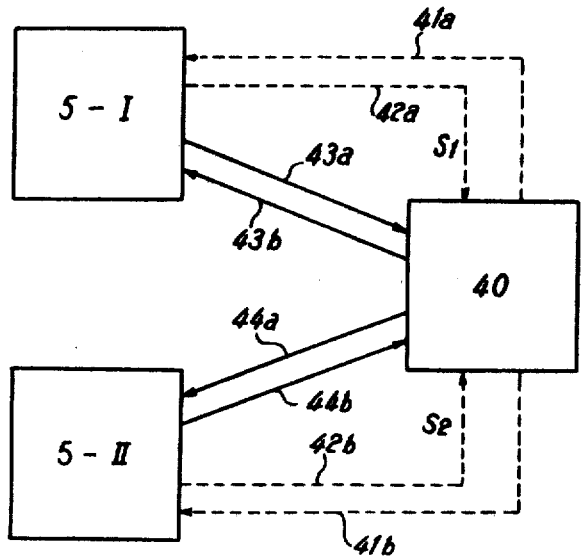
FIGS. 17, 19, 21 and 22 are connection diagrams for explaining monitoring systems of this invention.

Referring to FIGURES 17 and 18, the construction and operation of the monitoring system (A) of this invention will now be described. A plurality of processors (for example, two systems 5–I and 5–II) are provided in parallel so as to operate independently. The monitor unit is shown by reference 40. If it is assumed that there is no line for transferring direct instructions between two processors 5–I and 5–II, process programs of these two processors 5–I and 5–II do not interfere with each other. One of the processors I–I and I–II is used as "master" processor and the other of the processors is usually used as "slave" processor which carries out the identical process operation and the processed result of which is employed only for comparing the processed results of two processors 5–I and 5–II. The master processor and the slave processor can be operated in the same rank, in which one of the systems performing its data-processing at a time earlier than the other processor waits for the completion of the data processing of the other processor. It is necessary for testing the processed results of the processors 5–I and 5–II that the two processors 5–I and 5–II carry out the identical process to each other. To meet this requirement, the master processor (for example, the processor 5–I) must give information to the slave processor (for example, the processor 5–II) and the monitor unit 40 in case of starting process of a new message. In this case, the master processor 5–I sends, to the monitor unit 40 a signal which indicates the start of the data processing of a new message. The monitor 40 monitors the conditions of the processors 5–I and 5–II through paths 41a and 41b and instructs the master processor to send, to the slave processor, a control message for causing it to process the same message as the master processor. This instruction is transferred through paths 43a and 44a if the processors 5–I operates as the master processor or through lines 44b and 43b if the processor 5–II operates as the master processor.

Process program of each of the processors 5–I and 5–II can be divided into a plurality of jobs according to kinds of their process. In case of the processing of a message, test data are made, for each of the divided jobs, from the processed results of the respective jobs according to the predetermined principle and are stored in the respective processors 5–I and 5–II. At the time when a message has been processed in the two processors 5–I and 5–II, the test data indicative of test results of jobs of the process program are collected. These data is arranged in the order of collection and forms a test word of the processors 5–I and 5–II.

Referring to FIGURES 18A and 18B, the formation of the test word will now be described. Test word shown in FIGS. 18A and 18B correspond respectively to the processors 5–I and 5–II. If the contents of the information of the test word is considerably large, the test word can be divided into a plurality of parts. The test data corresponding to each of the jobs has to have an amount of information necessary to detect errors in the corresponding job, so that the number of bits of this test data is determined in accordance with the length of the corresponding job.

Examples of the principle to form the test word will be described below.

(1) A predetermined character picked up from the processed result of the corresponding job is employed for the test data. By way of example, if the character is determined as the last character of the processed result, the predetermined character is "4" (represented by the state "01010" of 5-unit code) with respect to a processed result "324" (three hundred and twenty four).

(2) The test data consists of the binary sum or binary product of predetermined characters picked up from the characters forming the processed result of the corresponding job. If the test data is the binary sum of all the characters of the processed result and this processed result is "324," "3," "2" and "4" being represented, respectively, by the state of code "10000," "11001" and "01010," the test data is "10011" obtained from the following equation:

$$10000 \times 11001 + 01010 = 10011$$

(3) The test data is composed of the job number and data indicative of the processed result of the corresponding job which are arranged together. By way of example, if the job number is "5" at the Example 2 described above, the test data is indicated by the states of bits (00101, 10011). This example is effective to a processing in which the flow-chart of the process program has complicated branches.

In the above example, the test datum is represented by 5-unit code. However, an optional number of bits of the unit code can be employed.

The test data is formed per each job according to the above mentioned principle. At the time when the process has been completed with respect to a message, the test word (TWa or TWb) is made of a plurality of test data $(J_{1a}, J_{2a}, J_{3a} \ldots)$ or $(J_{1b}, J_{2b} \ldots)$ as shown in FIGS. 18A and 18B. The processors 5–I and 5–II store respectively the test words $TW_1$ and $TW_2$ and transmit signals $S_1$ and $S_2$ indicative of the completion of the respective process through paths 42a and 42b. The signals $S_1$ and $S_2$ are received at the monitor unit 40, which monitors the respective processors 5–I and 5–II through the paths 41a and 41b and instructs them to transfer the test words $TW_1$ and $TW_2$ through paths 42a and 42b respectively.

The test words $TW_1$ and $TW_2$ are compared with each other at the monitor 40. If the test word $TW_1$ and $TW_2$ coincide with each other in this compare operation of the monitor unit 40, the master processor 5–I or 5–II sends out the processed result obtained by processing the message as it is confirmed that the respective process of the processor (5–I or 5–II) is carried out without error. In case where the test words $TW_1$ and $TW_2$ do not coincide with each other, the test data $(J_{1a}, J_{2a} \ldots)$ and $(J_{1b}, J_{2b} \ldots)$ corresponding to jobs for which the processes are carried out without errors coincide, respectively, with one another if processes are carried out without errors with respect to some jobs. In other words, it can be known that error produces in the process of a job corresponding to the test data at which a first incoincidence is detected. This means that if the error of process is caused in fault of a part of the processor (5–I or 5–II), the fault part can be searched out by said non-coincidence datum or data and that if the error of process is caused in a temporal accident, the process to be repeated again may be carried out from the job at which the process is erroneously carried out.

In the above description, it is assumed that two processors 5–I and 5–II are arranged in parallel and operate independently. However, this monitor system (A) of this invention can be applied to a single processor in which double processes are carried out successively with respect to the respective messages. In this case, the processed results obtained by said double processes are checked by the monitor unit 40 similarly as described above.

The monitor unit 40 can be provided in the respective processors without providing such an independent unit.

Another type of monitoring system (B) of this invention will now be described. To make the difference between the conventional monitoring system and the system of this invention of this type, disadvantages of conventional systems will be first described.

In the conventional data processor, even if "error" is caused in a process program of "soft-ware" whereby the program circles a certain loop or even if a process runs on an abnormal program whereby the necessary time of the process becomes longer such errors are frequently left, as they are, without detection of such errors.

The monitoring system (B) of this invention without said disadvantages has the following features. (1) The process program is divided previously into a plurality of blocks. (2) A certain instruction is inserted at the start or the end of the respective block of the program. (3) To count times between detections of adjacent two of the instructions, a counter is provided. The counter starts its counting operation from the instant of every detection of said inserted instructions.

In the system of the monitoring system formed according to the above features, if the counter produces its carry, this carry signal indicates "error" of the process.

Figure 19:
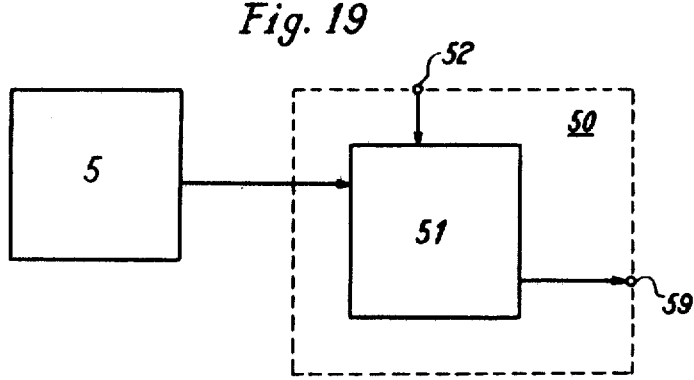
Figure 20:
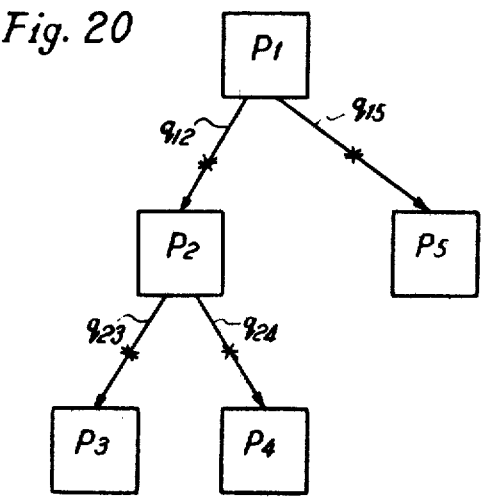
FIG. 20 is a diagram for describing a monitoring system for use in this invention.

Referring to FIGS. 19 and 20, the construction and operation of an example of this invention will now be described. In FIG. 19, a monitor unit 50 provided with a counter 51 which is connected to the processor 5 to receive the control signal of the processor 5. The process program of the processor 5 is divided into a plurality of blocks $P_1$, $P_2$, $P_3$ ... as shown in FIG. 20 by way of example. At each of interlinking points designated by mark (*), an instruction which makes the processor 5 to transfer a control signal $Ms$ to the monitor 50 is inserted. This control signal is received by the monitor 50 in which the counter 51 counts sequentially pulses of a clock pulse train applied from a terminal 52. The counting state of the counter 51 is reset to its initial condition at every receiving time of the control signal $Ms$, and the counter 51 starts thereafter to count pulses as mentioned above. The scale of the counter 51 is designed so as to be longer than a maximum time for processing the program block ($P_1$, $P_2 \ldots P_n$). Accordingly, the counting state of the counter 51 does not reach the full scale except that the processor 5 operates in the normal condition.

If "error" is caused in one of the program blocks $P_1$, $P_2$ ..., the control signal $Ms$ for resetting the counter 51 to its initial state is not received by the counter 51 even if a predetermined time corresponding to the scale has expired. Accordingly, the counting state of the counter 51 reaches the full-scale and the counter 51 produces its carry pulse. If the monitor 50 is designed so that this carry pulse is detected by an alarm means, error of the processor 5 can be easily detected.

Figure 21:
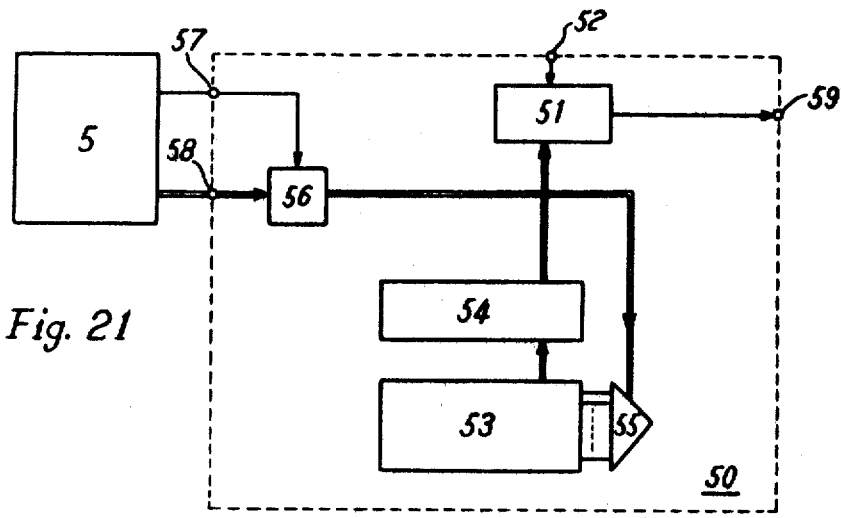

Referring to FIG. 21, another example of the monitoring system (B) will be described. In this example, the scale of the counter 51 is determined independently with respect to each of the program blocks $P_1$, $P_2$, $P_3$ .... The control signal $Ms$ of this example is the distinguishable number (for example, the serial number) of the branches $Q_{12}$, $Q_{23}$, $Q_{24}$ ... in the flow chart of the process program. A memory 53 stores previously information indicative of the counting scales corresponding to the respective program blocks between the adjacent distinguishable numbers. At the time when one of the distinguishable numbers is transferred from the processor 5 to the monitor 50, a selector 55 reads out the scale information corresponding to the transferred number from the memory 53 to a register 54, which sets the scale of the counter 51 so as to be equal to the readout scale information in the register 54. In this case, the number from the terminal 58 is a state-signal and passes through an AND gate 56, to which sampling pulses are applied from a terminal 57. Accordingly, the processor 5 and the monitor unit 50 are time-divisionally linked with each other.

Figure 22:
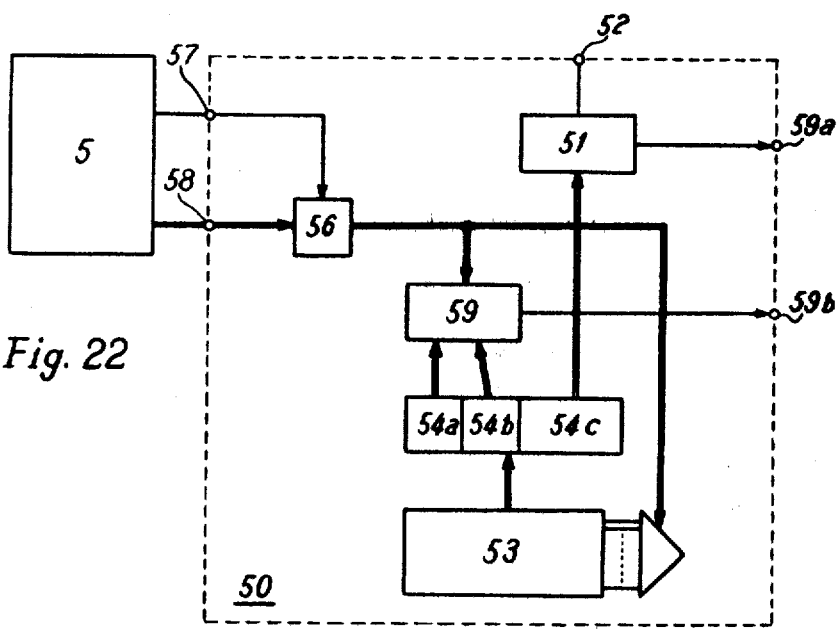

Referring to FIG. 22 another example of the monitoring system will be described. In this example, the register 54 is composed of three registers 54a, 54b and 54c and is further provided with a coincidence circuit 59. The register 54c is the same as the register 54 of the example shown in FIG. 21. The registers 54a and 54b store respectively control signals to be successively transferred to the monitor 50. By way of example, if the register 54c stores the control signals inserted into the branch $Q_{12}$ of the flow chart shown in FIG. 20, the registers 54a and 54b store respectively the control signals which identify the branches $Q_{23}$ and $Q_{24}$.

If the control signals, transferred next time, are not the control signals which correspond to the branches $Q_{23}$ or $Q_{24}$ the compare circuit 59 produces an output signal at a terminal 59b as "alarm."

What we claim is:

1. A time-divisional accumulation and distribution system for digital information in which a plurality of input channels and a plurality of output channels are time-divisionally connected respectively; comprising:

an input converting circuit for converting serial signals of a plurality of the input channels to respective characters of the input channels in a time-divisional manner for each of the input channels;

a first buffer memory coupled with the input converting circuit for storing temporarily words accumulated from the converted characters of the input channels;

a serial-access mass memory coupled with the first buffer memory and having a number of successively accessible memory zones in each of which a predetermined number of words can be stored as a message or a part of a message, zone-identifying information being read out in response to the access to each of the memory zones;

a data-processor for processing information of the messages in a time-divisional manner independent of the timing of the input converting circuit;

a second buffer memory coupled with the serial-access mass memory and the data-processor for temporarily storing information of each of the messages to transfer the information of each of the messages between the serial-access mass memory and the data-processor, the data-processor accessing randomly to the information of the messages stored in the second buffer memory;

a third buffer memory coupled with the serial-access mass memory for storing temporarily words read out from the serial-access mass memory in word-registers thereof which correspond respectively to the output channels;

an output converting circuit coupled with the third buffer memory for converting the words stored in the third buffer memory to respective characters of a plurality of output channels so as to distribute the converted character to the respective output channels in the same time-divisional manner as the input converting circuit for each of the output channels and in a character-wise manner;

a zone-state memory comprising a number of zone control words corresponding respectively to the memory zones of the serial-access mass memory, the zone control words being respectively the control information of the respective memory zones of the serial-access mass memory indicating the state of the corresponding memory zone and necessary for transferring words from the memory zone to the first, second and third buffer memories;

a first control memory comprising a plurality of input control words corresponding respectively to the input channels, the input control words being accessible successively and each indicating the state of accumulating the signal of the corresponding input channel to the first buffer memory;

a third control memory comprising a plurality of output control words corresponding respectively to the output channels, the output control words being accessible successively and each indicating the state of distributing the signal of the corresponding output channel from the third buffer memory;

a first control coupled with the input-converting circuit, the first buffer memory and the first control memory to accumulate words from the converted characters of the input channels and to store the accumulated words to the corresponding address of the first buffer memory and for detecting the start and end of each message of each input channels to set the state of the first control memory to a desired state;

a third control coupled with the output-converting circuit, the third buffer memory and the third control memory to convert to characters the words transferred from the serial-access mass memory so as to distribute the converted characters to the respective output channels;

a second control coupled with the second buffer memory and the data-processor to control the storing of the information of each message in the second buffer memory by receiving the zone-identifying information and transfer-instruction generated from the data-processor;

a mass memory control coupled with the first control, the second control, the third control and the serial-access mass memory to read out the corresponding word from the zone state memory in accordance with the zone-identifying information so that the registration of the input channel starting to accumulate the message thereof and the transferring of message from the first buffer memory to the mass memory are performed in cooperation with the first control, so that the transferring of the message from the mass memory to the third buffer memory is performed in cooperation with the third control, and so that the block-transferring of information of the message between the mass memory and the second buffer memory is performed in cooperation with the second control;

whereby the writing-in, to the serial-access mass memory, of the digital information applied from the input channels and the data-processor and the reading-out, from the serial-access mass memory, of the digital information to be supplied to the output channels and the data-processor are performed in response to successive access to the memory zones of the serial-access mass memory.

2. A system according to claim 1, in which each of the memory zones of the serial-access mass memory is composed of an inter-record gap of fixed length and a memory zone succeeding to the inter-record gap, the length of each of the inter-record gaps being determined so as to be obtainable of a time necessary for controlling the message stored in the corresponding memory zone.

3. A system according to claim 1, in which the input converting circuit comprises a plurality of time-divisional serial-parallel converters and an input selector for scanning the outputs of the time-divisional serial-parallel converters, the time-divisional serial-parallel converters being connected to the input channels so as to be operating in the same modulation rates, the input channels operating in the different modulation rates being respectively connected to different ones of the time-divisional serial-parallel converters operating in the corresponding modulation rates, whereby the maximum transfer rates of digital information from the respective time-divisional serial-parallel converters to the input selector are equal to one another.

4. A system according to claim 1, in which the processor comprises a multiplex data-processor performing multiple processes of digital information each of which is divided into a plurality of jobs, test data including identification-information of the corresponding job being derived, per each of the divided jobs, from the processed results of the respective jobs of the multiple processes in accordance with the predetermined principle, the multiple processes of the multiplex data-processor being checked by comparing respectively the test data of the divided jobs of one of the multiple processes with the corresponding test data of the divided jobs of another of the multiple processes to detect whether or not successive one of the divided jobs are correctly performed.

5. A system according to claim 1, in which the system is further provided with a monitor circuit having a counter which has a predetermined scale and counts pulses generated from a pulse generator, the process program of the data-processor is divided previously into a plurality of blocks and an instruction is inserted at the top of each of the block of program to send out, to the monitor circuit, a control signal including identification-information of the corresponding one of the divided blocks, the counting state of the counter being reset at every receiving time of the instruction so as to have a scale larger than a scale corresponding to a necessary time for processing the corresponding block of program, whereby the respective processes of the blocks of program are checked by detecting a carry pulse of the counter.

6. A system according to claim 1, in which the output converting circuit comprises a plurality of time-divisional parallel-serial converters and an output selector for distributing the output of third buffer memory to the time-divisional parallel-serial converters, the time-divisional parallel-serial converters being connected to the output channels so as to be operating in the same modulation rates, the output channels operating in the different modulation rates being respectively connected to different ones of the time-divisional parallel-serial converters operating in the corresponding modulation rates, whereby the maximum transfer rates of digital information from the output selector to the respective time-divisional parallel-serial converter are equal to one another.

References Cited

UNITED STATES PATENTS

| | | |
|---|---|---|
| 3,212,061 | 10/1965 | Merfeld. |
| 3,245,045 | 4/1966 | Randlev. |
| 3,299,411 | 1/1967 | Capozzi et al. |
| 3,331,060 | 7/1967 | Willis. |
| 3,350,697 | 10/1967 | Hirvela. |
| 3,359,543 | 12/1967 | Corr et al. |
| 3,390,379 | 6/1968 | Carlson et al. |
| 3,417,377 | 12/1968 | Vietor et al. |
| 3,426,331 | 2/1969 | Joyce. |

PAUL J. HENON, Primary Examiner

H. E. SPRINGBORN, Assistant Examiner